(12) United States Patent
Maehara (10) Patent No.: US 8,902,362 B2
(45) Date of Patent: Dec. 2, 2014

(54) BROADCAST RECEIVING DEVICE AND METHOD

(75) Inventor: Masakazu Maehara, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/992,922

(22) PCT Filed: Dec. 12, 2011

(86) PCT No.: PCT/KR2011/009541
§ 371 (c)(1),
(2), (4) Date: Jul. 12, 2013

(87) PCT Pub. No.: WO2012/078011
PCT Pub. Date: Jun. 14, 2012

(65) Prior Publication Data
US 2013/0293782 A1    Nov. 7, 2013

(30) Foreign Application Priority Data

Dec. 10, 2010    (JP) .................................. 2010-276421
Dec. 9, 2011    (KR) ......................... 10-2011-0132133

(51) Int. Cl.
*H04N 5/50* (2006.01)
*H04N 21/438* (2011.01)
*H04N 21/4402* (2011.01)

(52) U.S. Cl.
CPC ............. *H04N 5/50* (2013.01); *H04N 21/4383* (2013.01); *H04N 21/440281* (2013.01)
USPC ........... 348/569; 348/563; 348/567; 348/570; 348/555; 348/553; 348/523; 348/656; 348/706; 348/707; 348/716; 348/725; 348/729; 348/731; 348/734; 725/38; 725/39; 725/86; 725/90; 725/94; 370/474; 370/457; 370/503; 345/156; 345/169

(58) Field of Classification Search
USPC ......... 348/569, 563, 567, 705, 706, 725, 731, 348/734, 570, 523, 553, 555, 656, 707, 716, 348/729; 725/38, 39, 86, 90, 94; 370/474, 370/503, 475; 345/156, 169
See application file for complete search history.

(56) References Cited

U.S. PATENT DOCUMENTS 5,719,637 A * 2/1998 Ohkura et al. ................... 725/56
5,786,845 A * 7/1998 Tsuria ............................. 725/32

(Continued)

FOREIGN PATENT DOCUMENTS

| EP | 2 079 233 A3 | 8/2011 |
| JP | 7193760 A | 7/1995 |

(Continued)

OTHER PUBLICATIONS

International Search Report dated Jul. 12, 2012 from the International Searching Authority in counterpart application No. PCT/KR2011/009541.

(Continued)

*Primary Examiner* — Jefferey Harold
*Assistant Examiner* — Mustafizur Rahman
(74) *Attorney, Agent, or Firm* — Sughrue Mion, PLLC (57) ABSTRACT

A prediction means for predicting a maximum delayed change time, which is the longest in a change time which allows a next program to be displayed, if a channel is selected to change the current program to the next program; and a display control means, by which, from a reception completion time when the reception of the current program has been completed, a relevant program is displayed on the basis of original program data remaining in a buffer at the relevant reception completion time, and at the same time, the reproduction speed of the display is based on a speed at which the current program is displayed during the period between the reception completion time and a maximum delayed change time.

15 Claims, 5 Drawing Sheets

(56) References Cited

U.S. PATENT DOCUMENTS

| | | | |
|---|---|---|---|
| 8,014,330 B2* | 9/2011 | Kim et al. | 370/312 |
| 8,059,211 B2 | 11/2011 | Lee | |
| 8,228,441 B2* | 7/2012 | Lee et al. | 348/731 |
| 2005/0081244 A1* | 4/2005 | Barrett et al. | 725/97 |
| 2006/0061693 A1 | 3/2006 | Lee et al. | |
| 2006/0109385 A1 | 5/2006 | Wakako et al. | |
| 2007/0188665 A1* | 8/2007 | Watson et al. | 348/731 |
| 2007/0195204 A1* | 8/2007 | Ha | 348/731 |
| 2008/0018796 A1 | 1/2008 | Lee | |
| 2008/0025345 A1* | 1/2008 | Park | 370/503 |
| 2008/0077969 A1 | 3/2008 | Okada et al. | |
| 2008/0079691 A1* | 4/2008 | Kuboyama et al. | 345/156 |
| 2008/0225181 A1* | 9/2008 | Kamada et al. | 348/726 |
| 2009/0251611 A1 | 10/2009 | Sumiyoshi et al. | |
| 2009/0265352 A1* | 10/2009 | Holenstein et al. | 707/8 |
| 2010/0031286 A1* | 2/2010 | Gupta et al. | 725/38 |
| 2010/0066919 A1* | 3/2010 | Nakajima et al. | 348/734 |
| 2010/0111108 A1* | 5/2010 | Akgul et al. | 370/474 |
| 2011/0078730 A1* | 3/2011 | Na et al. | 725/38 |
| 2011/0170613 A1* | 7/2011 | Tanaka | 375/240.25 |

FOREIGN PATENT DOCUMENTS

| | | |
|---|---|---|
| JP | 2001-292381 A | 10/2001 |
| JP | 200594451 A | 4/2005 |
| JP | 2005184457 A | 7/2005 |
| JP | 2006-94498 A | 4/2006 |
| JP | 2006-148825 A | 6/2006 |
| JP | 2008503181 A | 1/2008 |
| JP | 2008-92230 A | 4/2008 |
| JP | 2009-194452 A | 8/2009 |
| JP | 201081275 A | 4/2010 |
| JP | 2010251933 A | 11/2010 |
| KR | 100640338 B1 | 10/2006 |
| KR | 100648334 B1 | 11/2006 |

OTHER PUBLICATIONS

Written Opinion dated Jul. 12, 2012 from the International Searching Authority in counterpart application No. PCT/KR2011/009541.
Communication dated Sep. 1, 2014 issued by the European Patent Office in counterpart European Patent Application No. 11847799.1.
Communication dated Aug. 12, 2014 issued by the Japanese Patent Office in counterpart Japanese Patent Application No. 2010-276421.

* cited by examiner

BROADCAST RECEIVING DEVICE AND METHOD

CROSS-REFERENCE TO RELATED APPLICATIONS

This is a National Phase Application of International Patent Application No. PCT/KR2011/009541, filed Dec. 12, 2011. This application claims priority from Japanese Patent Application No. 2010-276421, filed Dec. 10, 2010, and Korean Patent Application No. 10-2011-0132133, filed Dec. 9, 2011. The disclosures of the prior applications are hereby incorporated in their entireties by reference.

BACKGROUND

1. Field

The present invention relates to a broadcasting receiving device for receiving and outputting broadcasting waves, and more particularly to, a broadcasting receiving device suitable for digital broadcasting.

2. Description of the Related Art

A broadcasting receiving device such as digital television receives digital broadcasting waves, decodes the received digital broadcasting waves to image data, buffers a predetermined amount of the decoded image data, and displays the buffered image data on a screen. Thus, in addition to frequency tuning performed on conventional analog television, the above-described decoding and buffering are necessary until a channel is changed. Further, moving pictures experts group (MPEG) does not build an image until an intermittently transmitted I picture appears, and thus a relatively long period of time is necessary.

During the channel change, a blank state in which nothing is displayed on a screen occurs. An increase in the blank state may give users fatigue.

To solve this problem, the conventional methods disclosed in the patent

PRIOR TECHNICAL PUBLICATIONS

Patent Publications

1: Japanese Patent Application Publication No. 2008-503181
2: Japanese Patent Application Publication No. 2005-184457
3: Japanese Patent Application Publication No. 2010-81275
4: Japanese Patent Application Publication No. 2005-94451

However, the patent publications 1 and 2 disclose a high blank occurrence possibility and fail to provide a solution thereof. For example, the patent document 2 discloses predicting a time at which a next I picture appears on broadcasting waves after a channel change if a channel change manipulation (also referred to as a channel selection change) by a user is received, delaying a channel change operation in a device in accordance with the predicted time, and reproducing an original program until the channel change operation. As seen from the operation, a blank occurs during a channel change operation period.

Also, the patent publications 3 and 4 disclose displaying a still image during a blank. However, the patent publications 3 and 4 disclose not changing to a blank state which gives users fatigue.

The present invention provides execution and displaying of a next program without giving users fatigue if possible during a channel selection change.

SUMMARY

The present invention provides a broadcasting receiving device comprising prediction means for predicting a most delayed change time, which is the latest in a change time which allows a next program to be displayed, if a channel is selected to change a current program to a next program; and a display control means, by which, from a reception completion time when the reception of the current program has been completed, a relevant program is displayed on the basis of original program data remaining in a buffer at the relevant reception completion time, and at the same time, the reproduction speed of the display is set as a speed at which the current program is displayed during the period between the reception completion time and the most delayed change time.

In addition, the prediction of the most delayed change time by the prediction means follows broadcasting rules set for each country or each region.

However, since a previous program can be displayed at a slower speed than usual by the display control means without stopping the previous program by the most delayed change time, an occurrence of blank can be definitely prevented until the next program is displayed. Further, if it is possible to display the next program faster than the most delayed change time, a display of the previous program may be stopped at the most delayed change time.

If the broadcasting receiving device further comprises notification means for notifying a user of a channel selection operation from the reception completion time and the most delayed change time, for example, a more pleasant change environment may be provided by preventing the user from pressing a button several times since the user mistakes the change as not being accepted.

The prediction means may calculate the most delayed change time based on data included in broadcasting waves.

According to an aspect of the present invention, there is provided a broadcasting receiving method comprising: a receiver configured to receive a channel change manipulation; and a display control unit configured to display a current program based on current program data remaining in a buffer at a reception completion time of the current program, the reception completion time being based on the received channel change manipulation, and displaying information for a predetermined period of time indicating that the channel change manipulation is being processed.

The broadcasting receiving method may further comprise: when the channel change manipulation is received, predicting a delayed change time at which a display of a next program is possible, wherein the predetermined period of time is from the reception completion time to the delayed change time.

The delayed change time may be a maximum delayed change time, the maximum delayed change time being a latest time at which a displaying of the next program is possible.

A channel selection operation may be displayed to a user between the reception completion time and the maximum delayed change time.

The maximum delayed change time may be calculated based on data included in broadcasting waves.

A reproduction speed of the display of the program may be set based on a speed of a display of the current program between the reception completion time and a maximum delayed change time.

The displaying of the current program may comprise: adjusting a reproduction speed of the display of the current program according to at least one from among an amount of program data that is not reproduced and an amount of program data that is remaining in the buffer at the reception completion time.

According to another aspect of the present invention, there is provided a broadcasting receiving device comprising: a receiver configured to receive a channel change manipulation; and a display controller configured to display a current program based on current program data remaining in a buffer at a reception completion time of the current program, the reception completion time being based on the received channel change manipulation, and the display controller configured to display, for a predetermined period of time, information indicating that the channel change manipulation is processed.

According to another aspect of an exemplary embodiment, there is provided a broadcasting receiving method comprising: receiving a channel change manipulation; predicting an amount of time for processing a channel change; and displaying a current program for a duration of the predicted amount of time from a time of receiving the channel change manipulation until a next program is displayed.

According to another aspect of an exemplary embodiment, there is provided a broadcasting receiving device, comprising: a receiver configured to receive a channel change manipulation; a predictor configured to predict an amount of time for processing a channel change; and a display controller configured to display a current program for a duration of the predicted amount of time from a time of receiving the channel change manipulation until a next program is displayed.

According to an embodiment of the present invention, for example, even a digital broadcasting receiving device comprising a tuner may readily realize a channel selection definitely without causing a blank (a display disabled state) to occur during channel selection processing. Further, a next program may be allowed to be executed and displayed without giving a user fatigue if possible during the channel selection change.

DETAILED DESCRIPTION

The present invention will now be described more fully with reference to the accompanying drawings, in which an embodiment of the present invention is shown.

A broadcasting receiving device 100 according to the present embodiment, for example, digital television, may be a digital versatile disk (DVD) player, a recording device, etc. if it is possible to receive digital broadcasting waves.

Figure 1:
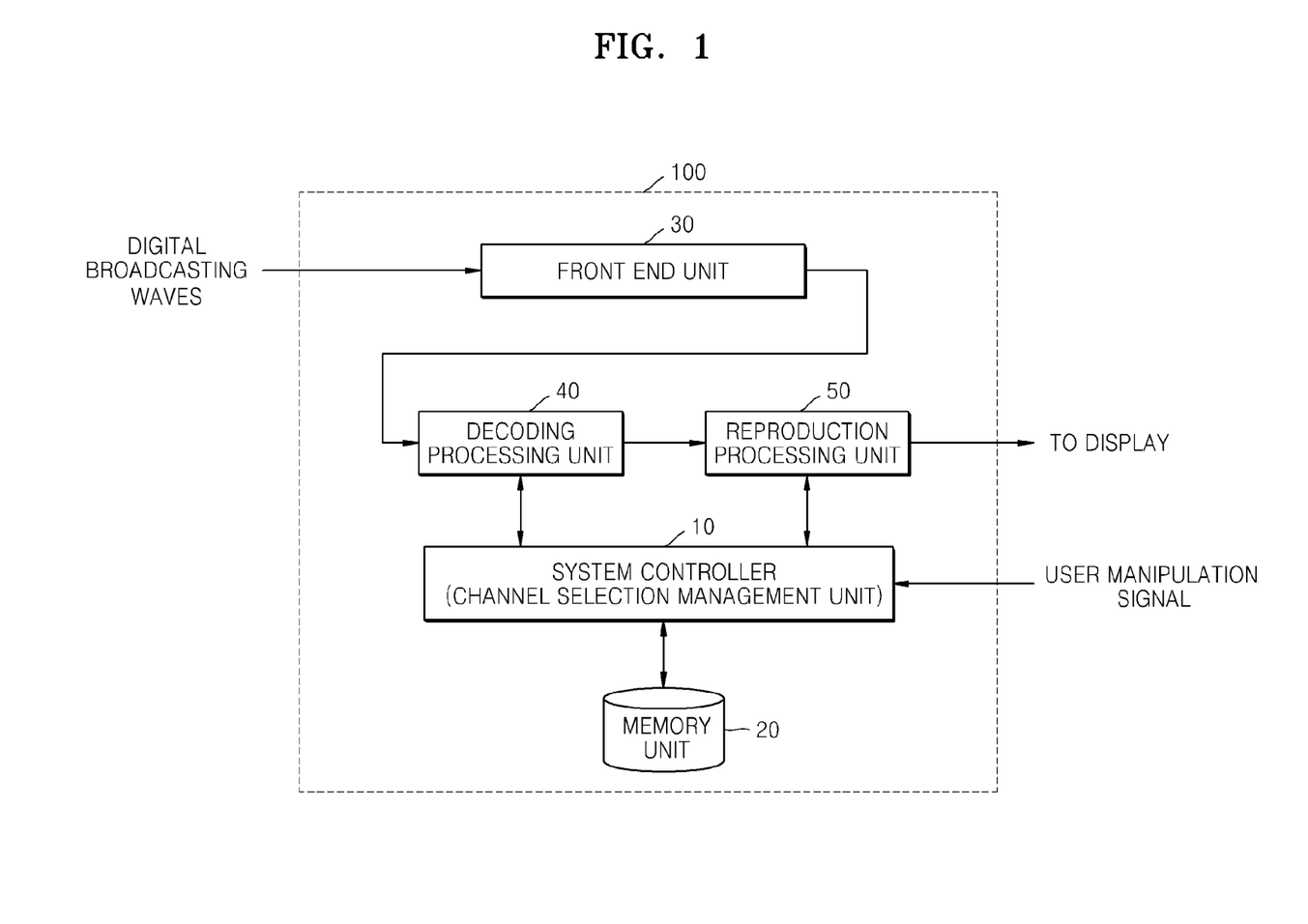
FIG. 1 is a block diagram of a broadcasting receiving device according to an embodiment of the present invention.

The broadcasting receiving device 100 has the configuration of FIG. 1. In addition, each element described as a functional block for various processing in FIG. 1 may be configured as a CPU, memory, other LSI, etc. by hardware, and may be implemented by a program for implementing decoding processing by software. Thus, it will be understood by one of ordinary skill in the art that these functional blocks can be implemented in various forms by hardware only, software only, or a combination of hardware and software, and the present invention is not limited thereto.

Reference numeral 10 of FIG. 1 denotes a system controller that is responsible for an overall control of the broadcasting receiving device 100.

Reference numeral 20 denotes a memory unit in which a program region in which a program for operating the CPU is described or a frame buffer region for buffering image data that will be described later is installed.

Reference numeral 30 denotes a front end unit that, although not shown, includes a tuner unit for channel selection receiving a desired broadcasting wave or a digital reconstruction unit for performing transport stream (TS) processing. The front end unit 30 only is installed.

Reference numeral 40 denotes a decoding processing unit. The decoding processing unit 40 performs descramble processing and demultiplexing processing on a TS output by the front end unit 30, decodes the TS, separately generates image data or sound data in an MPEG format and an electronic program guide (EPG), and simultaneously writes the image data or the sound data and the EPG on the memory unit 20.

Reference numeral 50 denotes a reproduction processing unit. The reproduction processing unit 50 obtains the image data and the sound data from the frame buffer region of the memory unit 20, obtains synchronization of the image data and the sound data based on a time stamp described in each data, and outputs the image data as a signal that may be available by a display.

However, in the present embodiment, the system controller 10 functions as a channel selection management unit 10 by adding a program. The channel selection management unit 10 performs a prediction function of predicting a most delayed change time, which is the longest in a change time which allows a next program to be displayed, if a channel is selected to change an original program (a current program) to a next program (if a channel change manipulation is received) and a display control function, by which, from a reception completion time when the reception of the original program has been completed according to the received channel change manipulation, the original program is displayed on the basis of original program data remaining on a buffer at the relevant reception completion time, and at the same time, the reproduction speed of the display is set as a speed at which the original program is displayed during a predetermined period between the reception completion time and the most delayed change time. The detailed description of the functions will be described with reference to FIG. 2.

Figure 2:
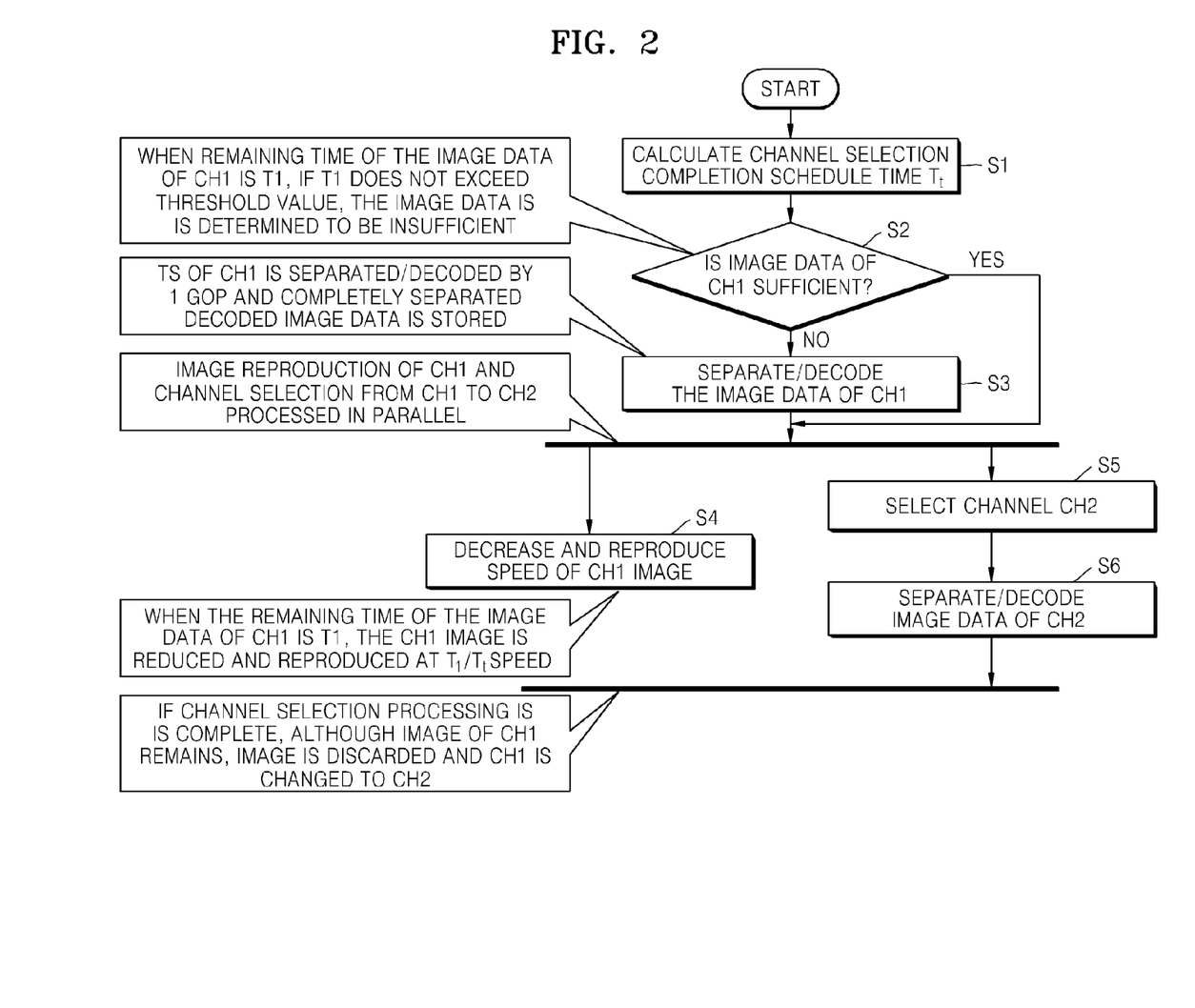
FIG. 2 is a flowchart of a full channel selection operation of a broadcasting receiving device according to an embodiment of the present invention.

If the user selects a channel selection station CH2 as the next program, the channel selection management unit 10 detects a channel selection change from CH1 to CH2 through the front end unit 30.

Next, the channel selection management unit 10 calculates a channel selection completion schedule time $T_t$ (a maximum time from a channel change manipulation acceptance to a channel selection completion) that is a maximum theoretical value until the channel selection from CH1 to CH2 is completed (step S1). This function corresponds to a prediction means recited in the claims. Also, the most delayed change time recited in the claims is a time at which the channel selection completion schedule time Tt has elapsed from a channel change manipulation acceptance time.

The corresponding prediction may have various forms since it depends on the digital broadcasting standard in each country or each region. In this regard, for example, the digital broadcasting standard (ISDB-T/S) of Japan will be described.

Figure 3A:
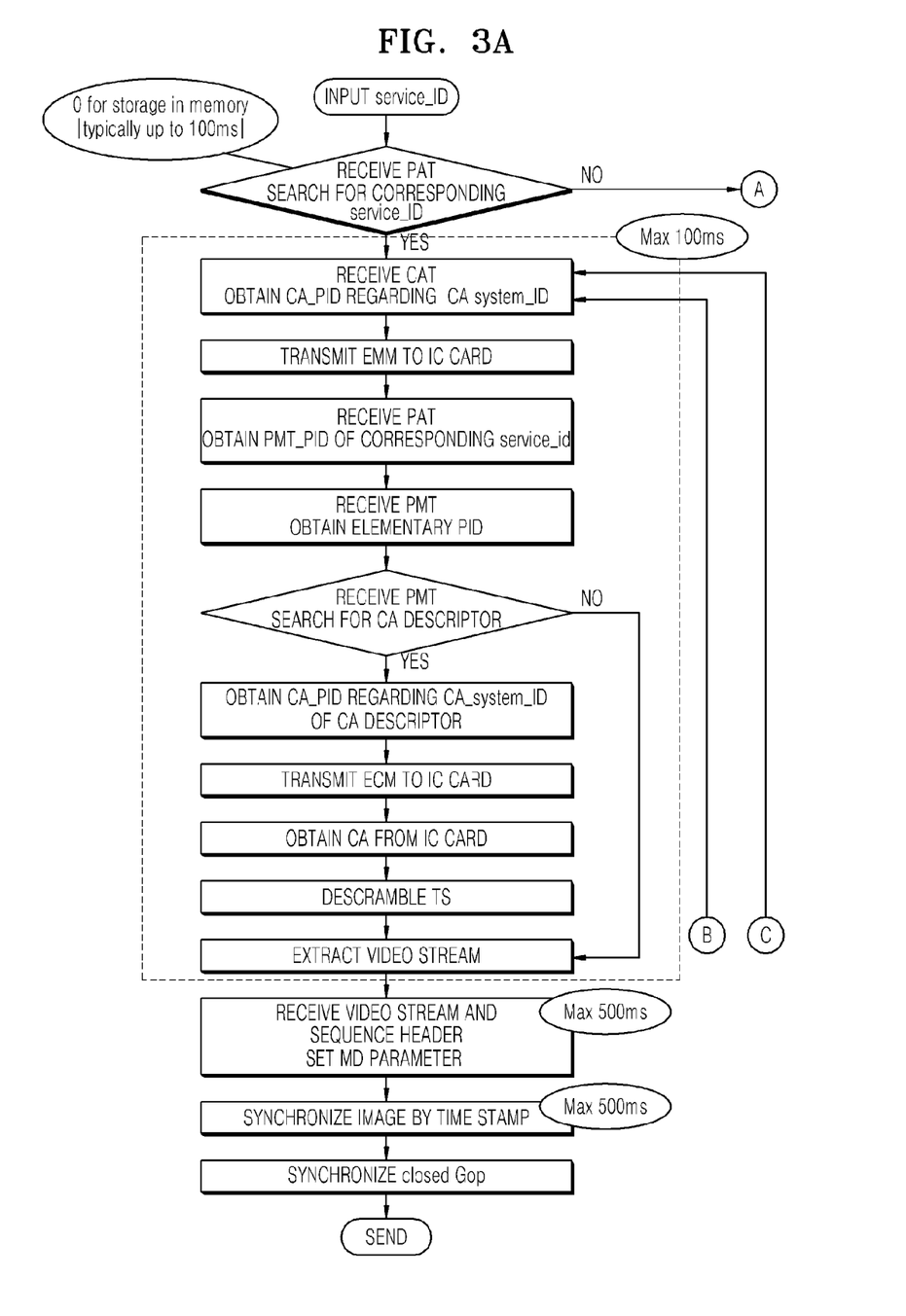
FIGS. 3A and 3B are flowcharts of an operation of a broadcasting receiving device that generates broadcasting waves to an image in accordance with the digital broadcasting standard in Japan and time necessary for the operation according to an embodiment of the present invention.
Figure 3B:
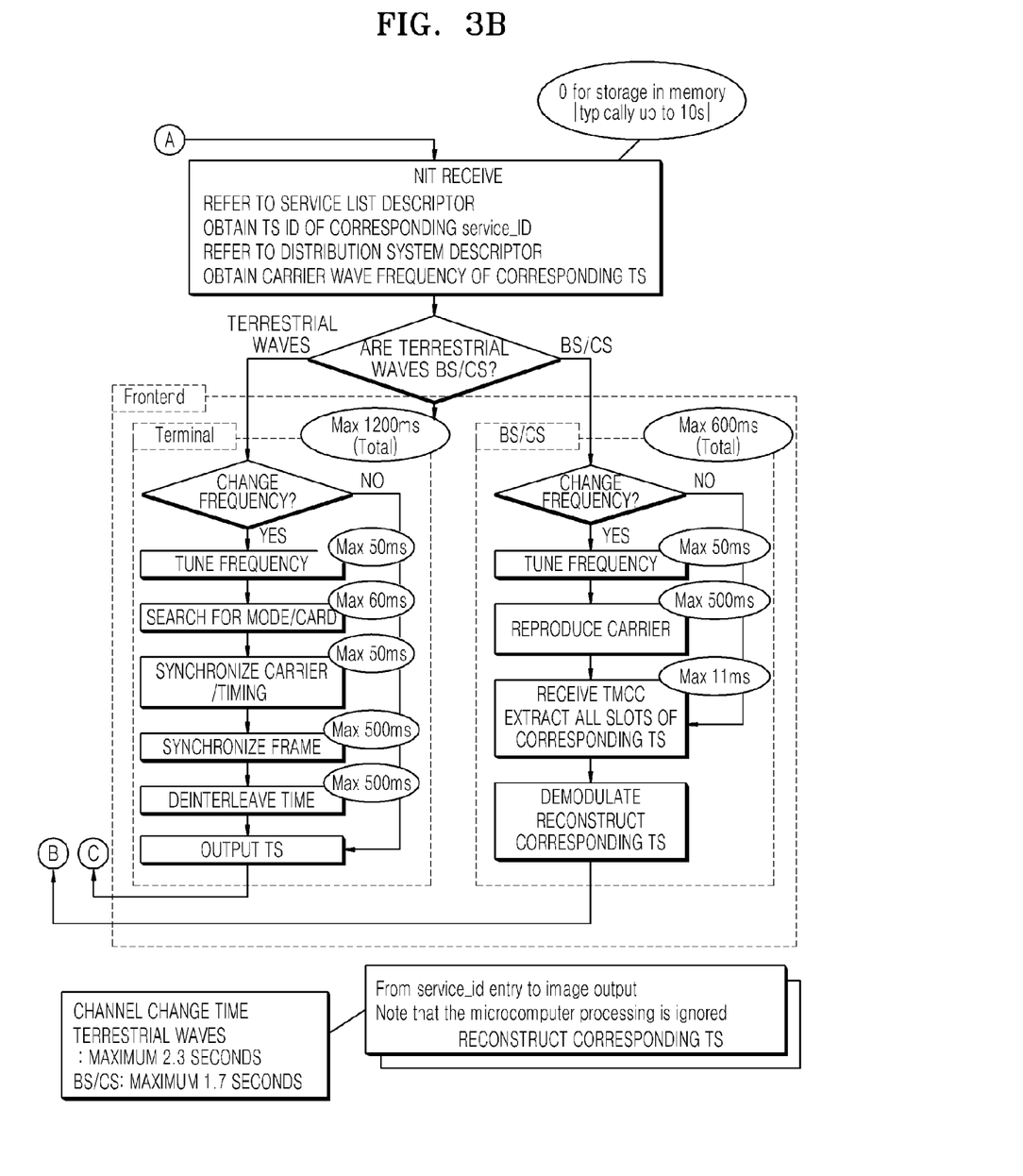

A sequence of the standard is shown in FIGS. 3A and 3B.

The channel selection management unit 10 of the present embodiment calculates five channel selection completion schedule times Tt described below according to the sequence of the standard.

(1) When a service ID of a channel selection station is not present in a PAT and the channel selection station needs a frequency change to terrestrial waves, the necessary time in the front end unit 30 is: max (1200 ms+100 ms), the necessary time in the decoding processing unit 40 and the reproduction processing unit 50 is: max (500 ms+500 ms), and $T_t$=2300 ms.

(2) When the service ID of the channel selection station is not present in the PAT and the channel selection station does not need the frequency change to terrestrial waves, the necessary time in the front end unit 30 is: max (0 ms+100 ms), the necessary time in the decoding processing unit 40 and the reproduction processing unit 50 is: max (500 ms+500 ms), and $T_t$=1100 ms.

(3) When the service ID of the channel selection station is not present in the PAT and the channel selection station needs the frequency change to BS or CS, the necessary time in the front end unit 30 is: max (600 ms+100 ms), the necessary time in the decoding processing unit 40 and the reproduction processing unit 50 is: max (500 ms+500 ms), and $T_t$=1700 ms.

(4) When the service ID of the channel selection station is not present in the PAT and the channel selection station does not need the frequency change to BS or CS, the necessary time in the front end unit 30 is: max (0 ms+100 ms), the necessary time in the decoding processing unit 40 and the reproduction processing unit 50 is: max (500 ms+500 ms), and $T_t$=1100 ms.

(5) When the service ID of the channel selection station is present in the PAT, the necessary time in the front end unit 30 is: max (100 ms), the necessary time in the decoding processing unit 40 and the reproduction processing unit 50 is: max (500 ms+500 ms), and $T_t$=1100 ms.

In addition, in this regard, when the max time is calculated, after a delay time in each unit is added, the max time is appreciated and added in a unit of 100 ms by providing a margin.

Next, when non-reproduction image data remaining in a frame buffer region is greater than a predetermined amount (Yes at step S2), the reproduction processing unit 50 adjusts a reproduction speed to be slow such that reproduction is naturally accessed, to $T_t$ with respect to the non-reproduction image data (step S4). In more detail, the speed is adjusted by adjusting a clock frequency by PLL of an STC clock and recovery. In this regard, the sound data may not be reproduced, may be slowly reproduced in synchronization with the image data, or may be reproduced at a usual speed.

In addition, even though completely separated/decoded image data is usually reproduced, if a time more than $T_t$ remains, the speed is not necessarily adjusted. Also, the reproduction speed is not necessarily constant, and may be in a nonlinear form, for example, gradually slow.

Meanwhile, when the remaining non-reproduction image data is smaller than the predetermined amount and thus a decreased-reproduction is difficult (No at step S2), the decoding processing unit 40 obtains an additional predetermined amount (for example, 1 GOP) of TS of CH1 from the front end unit 30, separates/decodes the image data, and secures a sufficient amount of image data of CH1 in the frame buffer region (step S3).

The reproduction processing unit 50 reproduces and processes the non-reproduction image data remaining in the frame buffer region (step S4).

The front end unit 30 changes CH1 to CH2 and outputs the TS, along with the reproduction and processing of the reproduction processing unit 50.

The decoding processing unit 40 obtains the TS of CH2 from the front end unit 30, separates/decodes the image data, and transmits the separated/decoded image data to the reproduction processing unit 50 (step S6). However, in this regard, a frame buffer region of CH2 is set not to overlap with the frame buffer region of CH1.

At this time, the reproduction processing unit 50 instantly stops the reproduction and processing of CH1 although the image data remains and concurrently starts reproducing the image data of CH2 by turning the reproduction speed back to the usual speed.

Figure 4:
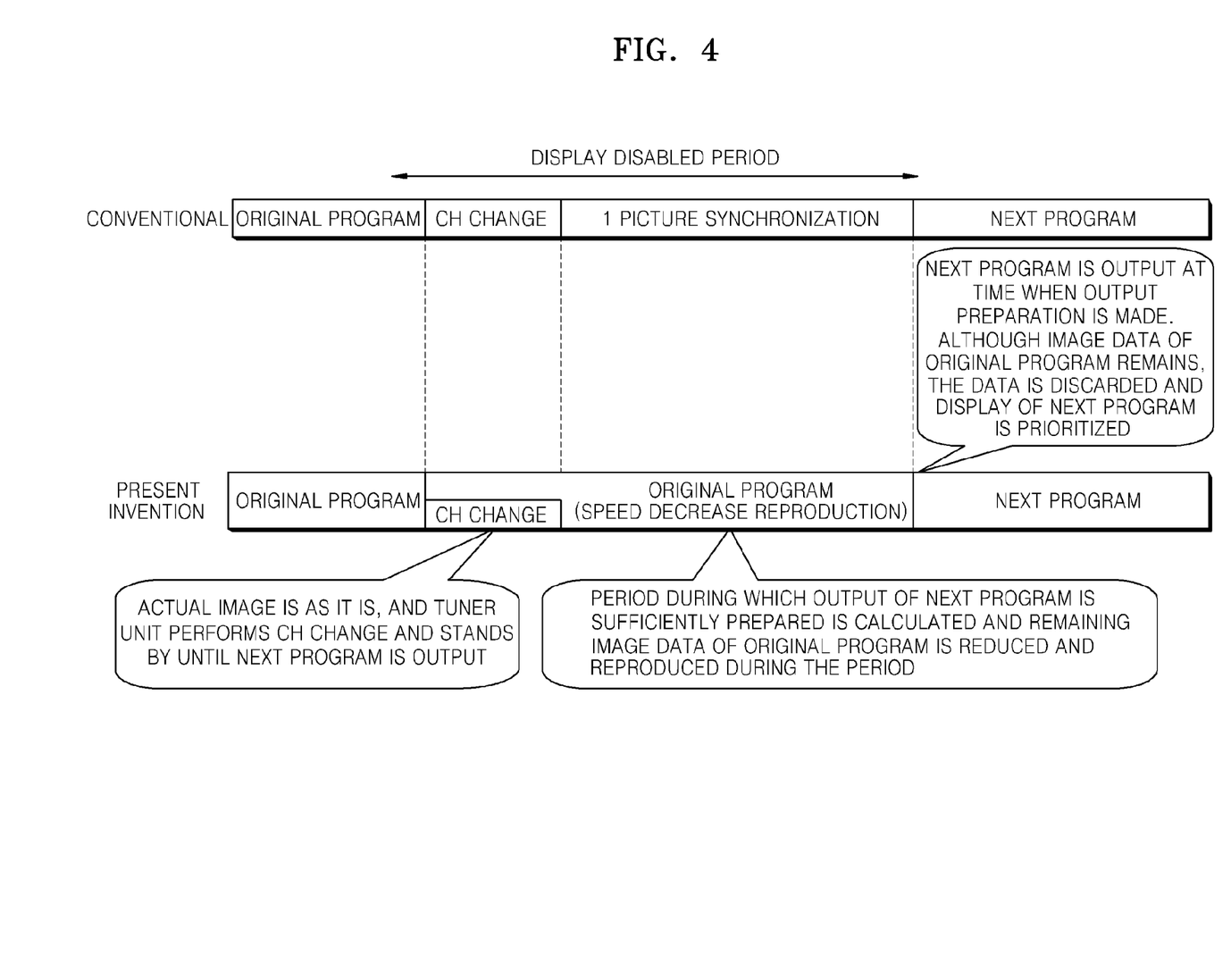
FIG. 4 is a timing chart of a comparison of a channel selection operation between a broadcasting receiving device according to an embodiment of the present invention and a conventional broadcasting receiving device.

The above-described operation timing chart is shown in FIG. 4. As seen from FIG. 4, even the digital broadcasting receiving device 100 configured as one tuner may smoothly realize a channel selection without incurring a blank (a display disabled period) that occurs during channel selection processing.

In addition, the present invention is not limited to the above embodiment.

For example, according to the above embodiment, although a user changes a channel, since a previous program (program of CH1) is still displayed on a screen, for example, there is a possibility of pressing a manipulation button several times since the user mistakes the change as not being accepted. To prevent this, a display or sound informing the user that the channel selection is being processed by the user may be output. For example, a display "a channel CH2 is being selected" may be output during processing of decreasing the reproduction speed of the image data of CH1.

According to another embodiment of the present invention, a notification means may be further included in the system controller 10 of FIG. 1 to display a current program based on current program data remaining in a buffer at a reception completion time from a reception completion time of the current program according to a received channel change manipulation, and notify a user that a channel is being selected from the reception completion time of the current program to a maximum delayed change time.

Further, although the above embodiment describes processing under the digital broadcasting standard of Japan, if the digital broadcasting standard differs according to a country such as Europe or North America or a region, accordingly a specific operation of a channel selection management unit may differ.

In addition, although the selection completion schedule time $T_t$ is calculated in various ways in the above embodiment, the selection completion schedule time Tt may be determined as the longest time.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc.

While the present invention has been particularly shown and described with reference to exemplary embodiments thereof, it will be understood by those of ordinary skill in the art that various changes in form and details may be made therein without departing from the spirit and scope of the present invention as defined by the following claims.

The present invention relates to a broadcasting receiving device that receives and outputs broadcasting waves, and, in general, may be applied to digital broadcasting.

The invention claimed is:

1. A broadcasting receiving method of a broadcast receiving device, the method comprising:
   receiving a channel change manipulation; and
   displaying a current program based on current program data remaining in a buffer of the broadcast receiving device, at a reception completion time of the current program, the reception completion time being based on the received channel change manipulation, and displaying information for a predetermined period of time indicating that the channel change manipulation is being processed.

2. The broadcasting receiving method of claim 1, further comprising: when the channel change manipulation is received, predicting a delayed change time at which a display of a next program is possible,
   wherein the predetermined period of time is from the reception completion time to the delayed change time.

3. The broadcasting receiving method of claim 2, wherein the delayed change time is a maximum delayed change time, the maximum delayed change time being a latest possible time at which a displaying of the next program is possible.

4. The broadcasting receiving method of claim 3, wherein a channel selection operation is displayed to a user between the reception completion time and the maximum delayed change time.

5. The broadcasting receiving method of claim 3, wherein the maximum delayed change time is calculated based on data included in broadcasting waves.

6. The broadcasting receiving method of claim 3, wherein a reproduction speed of the display of the program is set based on a speed of a display of the current program between the reception completion time and the maximum delayed change time.

7. The broadcasting receiving method of claim 1, wherein the displaying of the current program comprises: adjusting a reproduction speed of the display of the current program according to at least one from among an amount of program data that is not reproduced and an amount of program data that is remaining in the buffer at the reception completion time.

8. A broadcasting receiving device, comprising:
   a receiver configured to receive a channel change manipulation; and
   a display controller configured to display a current program based on current program data remaining in a buffer at a reception completion time of the current program, the reception completion time being based on the received channel change manipulation, and the display controller configured to display, for a predetermined period of time, information indicating that the channel change manipulation is processed.

9. The broadcasting receiving device of claim 8, further comprising: a predictor configured to predict a delayed change time at which a display of a next program is possible, when the channel change manipulation is received,
   wherein the predetermined period of time is from the reception completion time to the delayed change time.

10. The broadcasting receiving device of claim 8, wherein the display controller displays a channel selection operation to a user between the reception completion time and a maximum delayed change time.

11. The broadcasting receiving device of claim 9, wherein the predictor calculates the maximum delayed change time based on data included in broadcasting waves.

12. The broadcasting receiving device of claim 8, wherein a reproduction speed of the display of the program is set based on a speed of a display of the current program between the reception completion time and a maximum delayed change time.

13. The broadcasting receiving device of claim 12, wherein the program reproduction speed is adjusted according to an amount of non-reproduced program data remaining in the buffer at the reception completion time.

14. The broadcasting receiving device of claim 13, wherein the program reproduction speed is adjusted by adjusting a clock frequency.

15. The broadcasting receiving method of claim 7, wherein the reproduction speed of the display is adjusted by adjusting a clock frequency.

* * * * *